United States Patent
Hong et al.

(10) Patent No.: US 12,327,652 B2
(45) Date of Patent: *Jun. 10, 2025

(54) COMPOSITE CABLE FOR VEHICLE AND COMPOSITE CABLE ASSEMBLY INCLUDING SAME

(71) Applicant: LS CABLE & SYSTEM LTD., Anyang-si (KR)

(72) Inventors: Jung Pyo Hong, Gumi-si (KR); Sung Hoon Kim, Gumi-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 4 days.

This patent is subject to a terminal disclaimer.

(21) Appl. No.: 18/444,924

(22) Filed: Feb. 19, 2024

(65) Prior Publication Data
US 2024/0194375 A1   Jun. 13, 2024

Related U.S. Application Data

(63) Continuation of application No. 17/611,444, filed as application No. PCT/KR2019/014174 on Oct. 25, 2019, now Pat. No. 11,955,255.

(30) Foreign Application Priority Data

May 16, 2019 (KR) .......................... 10-2019-0057646
Oct. 25, 2019 (KR) .......................... 10-2019-0133378

(51) Int. Cl.
*H01B 11/10* (2006.01)
*H01B 5/08* (2006.01)
(Continued)

(52) U.S. Cl.
CPC ........... *H01B 11/1008* (2013.01); *H01B 5/08* (2013.01); *H01B 7/02* (2013.01); *H01B 9/003* (2013.01); *B60T 7/107* (2013.01); *B60T 8/176* (2013.01)

(58) Field of Classification Search
None
See application file for complete search history.

(56) References Cited

U.S. PATENT DOCUMENTS 1,955,024 A * 4/1934 Rohs .................. H01B 13/0214
                                                    57/215
5,493,071 A * 2/1996 Newmoyer ............ H01B 7/295
                                                    174/34
(Continued)

FOREIGN PATENT DOCUMENTS

EP          0821371 A2    1/1998
EP          0821371 A3    11/1998
(Continued)

OTHER PUBLICATIONS

International Search Report for related International Application No. PCT/KR2019/014174; report dated Nov. 19, 2020; (5 pages).
(Continued)

*Primary Examiner* — Krystal Robinson
(74) *Attorney, Agent, or Firm* — K&L Gates LLP

(57) ABSTRACT

The present disclosure relates to a composite cable for a vehicle and a composite cable assembly, which are capable of simultaneously providing a communication function and power to an electronic parking brake (EPB) and an anti-lock brake system (ABS) for use in a vehicle, and maximizing electromagnetic compatibility (EMC) shielding performance between internal components or external cables.

11 Claims, 7 Drawing Sheets

(51) Int. Cl.
*H01B 7/02* (2006.01)
*H01B 9/00* (2006.01)
*B60T 7/10* (2006.01)
*B60T 8/176* (2006.01)

(56) References Cited

U.S. PATENT DOCUMENTS

| | | | | |
|---|---|---|---|---|
| 6,010,788 | A * | 1/2000 | Kebabjian | H01B 11/002 |
| | | | | 174/105 R |
| 8,367,933 | B1 * | 2/2013 | Mumm | H01B 11/06 |
| | | | | 174/113 R |
| 2013/0220660 | A1 * | 8/2013 | Wong | H01B 7/046 |
| | | | | 228/101 |
| 2017/0229212 | A1 * | 8/2017 | Hayakawa | H01B 7/0045 |
| 2018/0151271 | A1 | 5/2018 | Sidlyarevich | |

FOREIGN PATENT DOCUMENTS

| | | |
|---|---|---|
| EP | 1393984 A1 | 3/2004 |
| JP | 2003303515 A | 10/2003 |
| JP | 2015138751 A | 7/2015 |
| JP | 2017131054 A | 7/2017 |
| JP | 2017188427 A | 10/2017 |
| KR | 20140106078 A | 9/2014 |
| WO | 2017109939 A1 | 6/2017 |

OTHER PUBLICATIONS

Written Opinion for related International Application No. PCT/KR2019/014174; report dated Nov. 19, 2020; (5 pages).
European Search Report for related European Application No. 19928877.0; action dated Apr. 18, 2023; (9 pages).

* cited by examiner

COMPOSITE CABLE FOR VEHICLE AND COMPOSITE CABLE ASSEMBLY INCLUDING SAME

CROSS-REFERENCE TO RELATED APPLICATIONS

The present application is a Continuation Application of U.S. application Ser. No. 17/611,444, filed on Nov. 15, 2021, which is a National Stage of International Application No. PCT/KR2019/014174 filed on Oct. 25, 2019, which claims the benefit of Korean Patent Application No. 10-2019-0057646, filed on May 16, 2019, and Korean Patent Application No. 10-2019-0133378 filed on Oct. 25, 2019, filed with the Korean Intellectual Property Office, the entire contents of each hereby incorporated by reference.

FIELD

The present disclosure relates to a composite cable for a vehicle and a composite cable assembly. More specifically, the present disclosure relates to a composite cable for a vehicle and a composite cable assembly, which are capable of simultaneously providing a communication function and power to an electronic parking brake (EPB) and an anti-lock brake system (ABS) for use in a vehicle, and maximizing electromagnetic compatibility (EMC) shielding performance between internal components or external cables.

BACKGROUND

Cables for a vehicle are continuously exposed to thermal stress, mechanical pressure load, bending load or impacts. Examples of cables for a vehicle include a communication (signal) cable for an anti-lock system (ABS) and a power cable for an electronic parking brake (EPB).

Therefore, durability and reliability levels of cables for a vehicle are required to be relatively stringent.

The communication (signal) cable for the ABS and the power cable for the EPB are designed to respectively transmit a sensor sensing signal and transmit power to drive the EPB but both of them are connected near a wheel or a tire and thus installation paths thereof to a target device from a controller of a vehicle are substantially the same.

In recent years, research has been conducted to integrate a communication (signal) cable for the ABS and a power cable for the EPB into one composite cable and products related thereto have been introduced, but adequate measures, e.g., electromagnetic compatibility (EMC) shielding, for electronic devices or other cables near the composite cable are not yet available.

That is, there is a need for measures for interference caused by interactive signals or noise due to electromagnetic waves generated in two single cables, mutual influence due to electromagnetic waves generated in a signal cable and a neighboring cable, and the like.

In relation to the former problem, it is expected that the ABS and the EPB are not mutually influenced by each other, because they are respectively controlled by a transmission single control (SCU) unit and an electronic stability control (ECU) and are operated separately from each other. However, actually, when the EPB is operated (when a vehicle is stopped or started), an inrush current (a transient current that increases instantaneously but returns to a normal state immediately, as shown when a circuit switch is activated may be generated, thus causing a malfunction of a sensor of the ABS due to electromagnetic waves due to the inrush current. When the sensor of the ABS malfunctions, a warning light of a dashboard related to auto hold related to the EPB, the ECU, the ECU, the ABS, or an integrated warning may be turned on.

In relation to the latter problem, for example, a pneumatic sensor of a tire is mounted in the form of a battery inside a wheel but may be influenced by a power cable for the EPB and thus may malfunction or a warning light may flicker due to error information. In the case of a hybrid vehicle or a pure electric vehicle that have recently been come into widespread use, a motor is installed therein to drive the vehicle and is generally installed near an individual wheel of the vehicle. Therefore, noise may occur in a communication cable, for control of the motor of the electric car or the like, due to power supplied through the power cable for the EPB, thereby causing a malfunction or a failure of the motor.

In addition, an EMC shielding means for a communication (signal) cable for the ABS, when an arrangement of a power cable for driving a motor of an electric vehicle or the like that has been recently come into widespread use is not assumed, is not adequate and should be reinforced.

With the advancement of automotive manufacturing technologies, as more machine components and electronic devices are included in vehicles, flexible cables are required to stably connect devices within a limited space.

SUMMARY

The present disclosure is directed to providing a composite cable for a vehicle and a composite cable assembly, which are capable of simultaneously providing a communication function and power to an electronic parking brake (EPB) and an anti-lock brake system (ABS) for use in a vehicle, and maximizing electromagnetic compatibility (EMC) shielding performance between internal components or external cables.

The present disclosure is also directed to providing a flexible cable for stably connecting devices within a narrow inner space of a vehicle.

According to an aspect of the present disclosure, there is provided a composite cable for a vehicle, comprising: a communication unit including a pair of communication lines to transmit a sensor sensing signal, a communication unit shielding layer covering the pair of communication lines to shield the pair of communication lines, and a communication unit jacket layer covering an outside of the communication unit shielding layer; a power unit including a pair of power lines to supply power; a cable shielding layer covering the communication unit and the power unit together to shield the communication unit and the power unit; and a cable jacket layer covering an outside of the cable shielding layer, wherein the communication unit jacket layer covers the communication unit shielding layer such that the communication unit has a round cross section, and a thickness thereof in a radial direction is 0.4 mm or more.

And the communication unit may be provided to transmit a sensor sensing signal of an anti-lock brake system (ABS), and the power unit is provided to supply power to an electronic parking brake (EPB).

And the pair of communication lines of the communication unit each may comprise a conductor formed of a copper alloy material and an insulating layer configured to insulate the conductor and formed of an XLPE material, and each may have a round cross section, and the communication unit shielding layer covers circumferences of the pair of communication lines in a state in which the pair of communication lines are circumscribed about each other.

And an outer diameter of the communication unit may be greater than an outer diameter of each of the pair of power lines of the power unit.

And the composite cable may further comprise at least one communication unit ground wire inside the communication unit shielding layer of the communication unit.

And the at least one communication unit ground wire may be in contact with outer circumferential surfaces of the pair of communication lines and an inner side of the communication unit shielding layer.

And each of the at least one communication unit ground wire may be formed of a tinned copper material and has a diameter less than a diameter of the communication line.

And the composite cable may further comprise at least one cable ground wire inside the cable shielding layer.

And the at least one cable ground wire may be formed of a tinned copper material and has a diameter less than a diameter of the power line.

And the at least one cable ground wire may be in contact with an outer circumferential surface of the communication unit, an outer circumferential surface of each of the power lines, and an inner side of the cable shielding layer.

And the communication unit shielding layer and the cable shielding layer may be each formed of an aluminum Mylar tape.

And the cable shielding layer may cover the communication unit and the pair of power lines of the power unit in a state in which the communication unit and the pair of power lines are arranged in a triangular form while being circumscribed about each other.

And the composite cable may further comprise a braid shielding layer provided outside the communication unit shielding layer and formed of a tinned copper material.

And the composite cable may further comprise a braid shielding layer provided outside the cable shielding layer and formed of a tinned copper material.

And the insulating layer of each of the communication lines of the communication unit may have a thickness of 0.4 mm to 0.5 mm, and the communication lines may have an insulating outer diameter of 1.6 mm to 1.8 mm.

And the conductor of each of the communication lines of the communication unit may comprise a self-twist and helically wound conductor manufactured by twisting multiple strands to form self-twisted strands with a twist pitch and helically winding the self-twisted strands with a winding pitch.

And the self-twist and helically wound conductor may comprise one center self-twisted strand and six self-twisted strands arranged around the center self-twisted strand and twisted in a direction opposite to a direction in which the center self-twisted strand may be twisted, wherein a direction in which the self-twisted strands are helically wound may be the same as a direction in which the center self-twisted strand is twisted.

And the twist pitch of the self-twisted strands of the communication lines of the communication unit may be less than the winding pitch of the self-twist and helically wound conductor.

And the number of strands constituting the self-twisted strands—of each of the communication lines of the communication unit may be five to ten, and the self-twist and helically wound conductor has an outer diameter of 0.8 mm to 1.0 mm.

And the communication unit jacket layer may be formed of a polyurethane material, and the communication unit may have an outer diameter of 4.1 mm to 4.5 mm.

And the pair of communication lines of the communication unit may be twisted with a binding pitch of 40 mm or less.

And the power lines of the power unit each may comprise a conductor and an insulating layer configured to insulate the conductor and formed of an XLPE material.

And the conductor may be formed of a tinned copper material.

And the insulating layer of each of the power lines of the power unit may have a thickness of 0.4 mm to 0.5 mm, and the power lines may have an insulating outer diameter of 2.8 mm to 3.2 mm.

And the conductor of each of the power lines of the power unit may comprise a self-twist and helically wound conductor manufactured by twisting multiple strands to form self-twisted strands with a twist pitch and helically winding the self-twisted strands with a winding pitch.

And the self-twist and helically wound conductor of the power unit may comprise one center self-twisted strand and six self-twisted strands arranged around the center self-twisted strand and twisted in a direction opposite to a direction in which the center self-twisted strand is twisted, wherein a direction in which the self-twisted strands may be helically wound is the same as a direction in which the center self-twisted strand is twisted.

And the twist pitch of the self-twisted strands of each of the power lines of the power unit may be less than the winding pitch of the self-twist and helically wound conductor.

And the number of strands constituting the self-twisted strand of each of the power lines of the communication unit may be fifty to sixty, and the self-twist and helically wound conductor of the power unit may have an outer diameter of 1.8 mm to 2.2 mm.

And the power units and the communication units may be twisted with a binding pitch of 120 mm or less, covered with the cable shielding layer, and coated with the cable jacket layer.

And the cable jacket layer, which covers the outside of the cable shielding layer such that the composite cable has the round shape, may be formed of a polyurethane material, and the composite cable may have an outer diameter of 9.5 mm to 10.5 mm.

According to an aspect of the present disclosure, there is provided a composite cable assembly for a vehicle, comprising: the composite cable mentioned above; a pair of communication connectors for a brake device of an anti-lock brake system (ABS), which are connected to communication units located at both ends of the composite cable; and a pair of power connectors for an electronic parking system (EPB), which are connected to power units located at both ends of the composite cable.

And in predetermined sections of both ends of the composite cable, the cable jacket layer may be stripped to split the communication unit and the power unit.

And the communication unit and the power unit may be split through terminal units or split regions thereof thereof are taped.

A composite cable for a vehicle and a composite cable assembly according to the present disclosure are capable of simultaneously providing a communication function and power to an electronic parking brake (EPB) and an anti-lock brake system (ABS) for a vehicle through a single cable, thereby improving convenience in manufacturing and maintaining a vehicle.

According to the composite cable for a vehicle and the composite cable assembly according to the present disclosure, a communication unit of the composite cable includes a communication unit shielding layer and further includes a cable shielding layer, thereby greatly reducing mutual influence due to noise caused by a current flowing through a sensor or a cable installed near a wheel or greatly improving EMC shielding performance.

According to the composite cable for a vehicle and the composite cable assembly according to the present disclosure, a communication unit ground wire may be included in the communication unit shielding layer of the communication unit or a braid shielding layer formed of a tinned copper material may be further provided to cover the communication unit shielding layer, which is is in an aluminum Mylar tape, so as to improve performance of shielding electromagnetic waves generated in the communication line or the power line or ground noise or an induced current due to electromagnetic waves, thereby preventing or minimizing malfunction due to mutual influence between the EPB and the ABS.

According to the composite cable for a vehicle and the composite cable assembly according to the present disclosure, a cable ground wire may be provided in the cable shielding layer of the composite cable or a braid shielding layer formed of a tinned copper material may be further provided to cover the cable shielding layer, which is in an aluminum Mylar tape, so as to improve performance of shielding electromagnetic waves generated in the communication line or the power line or ground noise or an induced current due to electromagnetic waves, thereby minimizing mutual influence between adjacent cables.

In addition, according to the composite cable for a vehicle and the composite cable according to the present disclosure, a direction and pitch in a conductor, the communication unit and the power unit are twisted together can be optimally designed to achieve excellent flexibility and bending resistance, thereby stably connecting devices within a limited space of a vehicle.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 1:
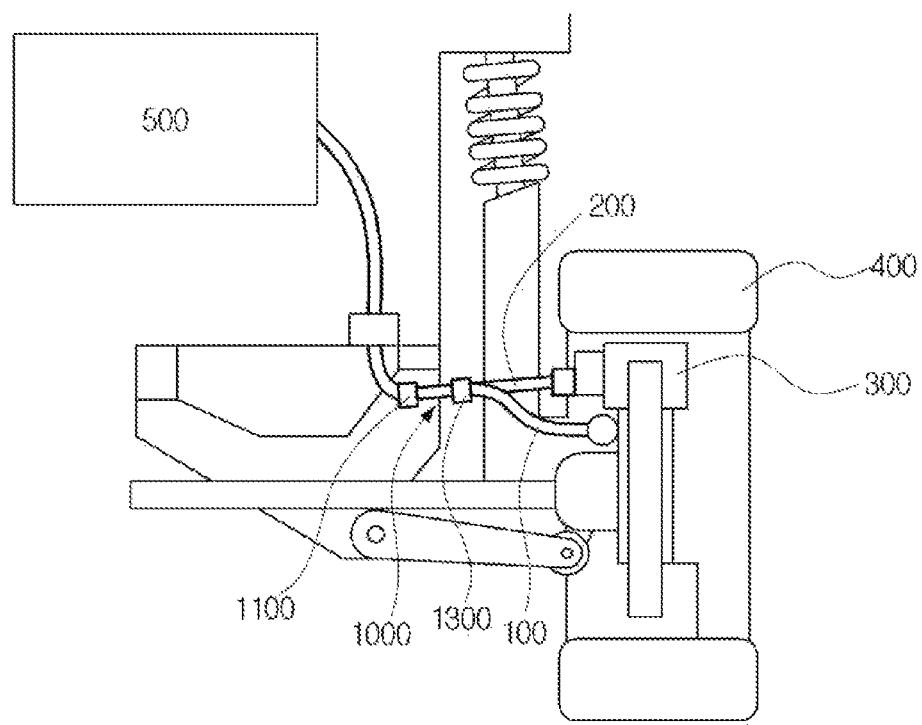
FIG. 1 is a schematic configuration diagram of a vehicle to which a composite cable for a vehicle according to the present disclosure is applied.

FIG. 1 is a schematic configuration diagram of a vehicle to which a composite cable 1000 for a vehicle according to the present disclosure is applied.

Many recently released vehicles are equipped with an electronic parking brake (EPB) and an anti-lock brake system (ABS).

The ABS is a device developed to prevent tires from being locked due to a driver's panic braking (sudden braking) and avoid a risk of sudden operation of a steering wheel so as to avoid a danger.

When a driver faces a dangerous situation, the driver would first jam his or he foot on a brake pedal but wheels are locked when the amount of braking power is extremely large. When the rotation of the wheels stop, the steering wheel is not moved at all and the driver cannot control a moving direction of a vehicle. The ABS refers to a device that performs pumping braking to step on the brake and take off the brake regardless of a driver's manipulation, so that the wheels may not be locked to prevent the above problem.

The ABS is designed to prevent the locking of the wheels so that a driver may avoid a danger through manipulation of the steering wheel, and allow a vehicle to be stopped within a shortest braking distance achievable according to conditions of tires and the road until the ABS is deactivated after the activation of the ABS.

The ABS should continuously detect whether the wheels are locked and thus includes a wheel speed sensor, and the wheel speed sensor may connected to an electronic control unit (ECU) of a vehicle or the like through a communication cable of the like.

An automotive brake system is a device that decelerates or stops a vehicle that is being driven. The automotive brake system is operated by performing braking through conversion of kinetic energy into thermal energy using a frictional force generated when a brake pad is pressed against both sides of disks rotated together with wheels.

An EPB system is a system that automatically operates a brake when a driver stops a vehicle and automatically releases the brake when the driver steps on an accelerator pedal to start the vehicle. A control function such as a vehicle spin prevention control is improved in an emergency braking situation using a parking brake.

When an electric control unit (ECU) such as a motor or the like is added to an existing mechanical parking brake system, a driver's convenience may be increased, a brake pedal need not be continuously stepped on when the ECU is used in a downtown driving road on which vehicles are repeatedly driven and stopped, thereby reducing the driver's fatigue, a vehicle may be prevented from sliding when the vehicle is started on a ramp, and the ECU is configured to be simply pressed with a finger to decelerate or stop a vehicle and thus has been welcomed by the older and weak or female drivers who do not have power enough to pull an existing parking brake.

The EPB system should supply power to a brake driving part+such as a motor near a wheel through a power cable or the like to drive an electronic brake.

As described above, in order to configure the EPB and the ABS for a vehicle, a controller such as an ECU or a power supply of the vehicle should be connected to each system connection point near a wheel of the vehicle through a communication cable and a power cable.

In the present disclosure, a communication cable and a power cable may be configured together as one composite cable to be easily installed and maintained inside a vehicle, based on similar installation paths thereof.

That is, as shown in FIG. 1, a communication function and power may be simultaneously provided through one composite cable 1000 by arranging the composite cable 1000 from a power supply or a controller 500 inside the vehicle to the vicinity of a wheel, arranging a fastening unit 1100 at an interface between the composite cable 1000 and a portion of the vehicle to be fixed, fixing the vehicle and the composite cable 1000 together by a method such as bolting, splitting the composite cable 1000 into the communication unit 100 and the power unit 200 through a split part 1300 near the wheel, and connecting the communication unit 100 and the power unit 200 to the EPB or the ABS, thereby increasing convenience in manufacturing and maintaining the vehicle.

The composite cable 1000 for a vehicle and a vehicle composite cable assembly 1 according to the present disclosure will be described in detail with reference to FIG. 2 and other drawings.

Figure 2:
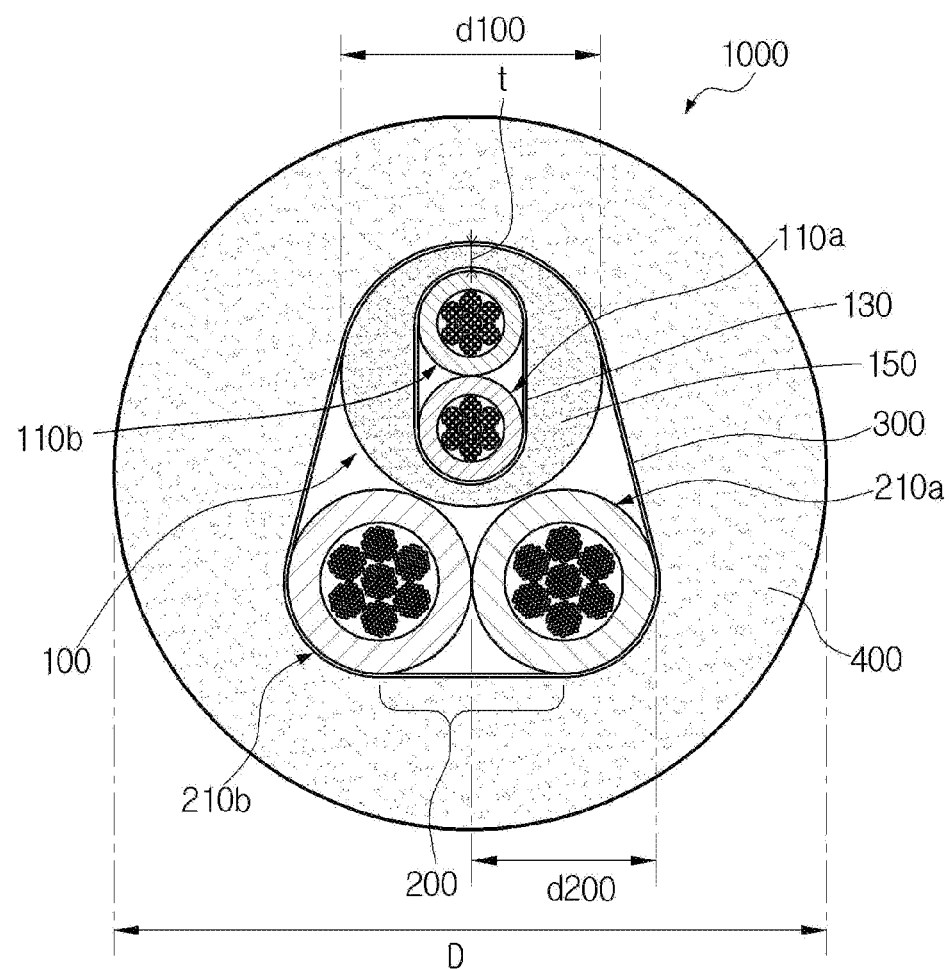
FIG. 2 is a cross-sectional view of a composite cable for a vehicle according to an embodiment of the present disclosure.

FIG. 2 is a cross-sectional view of a composite cable 1000 for a vehicle according to an embodiment of the present disclosure.

The composite cable 1000 for a vehicle according to the present disclosure includes: a communication unit 100 including a pair of communication lines 110*a* and 110*b* for transmitting a sensor sensing signal, a communication unit shielding layer 130 covering the pair of communication lines 110*a* and 110*b* to shield them, and a communication unit jacket layer 150 covering an outside of the communication unit shielding layer 130; a power unit 200 including a pair of power lines 210*a* and 210*b* to supply power; a cable shielding layer 300 covering the communication unit 100 and the power unit 200 together to shield them; and a cable jacket layer 400 covering an outside of the cable shielding layer 300. The communication unit jacket layer 150 covers the communication unit shielding layer 130 such that the communication unit 100 has a round cross section, and a thickness t thereof in a radial direction is 0.4 mm or more.

The communication unit 100 may be provided to transmit a sensor sensing signal from an ABS, and the power unit 200 may be provided to supply power to an EPB.

The communication unit 100 for transmission of the sensor sensing signal of the ABS may be configured as an independent cable including the pair of communication lines 110*a* and 110*b* each including an insulating layer, the communication unit shielding layer 130 for shielding the pair of communication lines 110*a* and 110*b* together, and the communication unit jacket layer 150.

In contrast, the power unit 200 may include the pair of power lines 210*a* and 210*b* to supply power to drive the EPB, and the pair of power lines 210*a* and 210*b* of the power unit 200 may individually include an insulating layer and be configured separately in the form of independent cables, so that the communication unit 100 and the pair of power lines 210*a* and 210*b* of the power unit 200 that are each in the form of a cable may be arranged in a triangular shape, and more particularly, an isosceles triangular shape.

The composite cable 1000 of the present disclosure may further include a cable shielding layer 300 covering the communication unit 100 and the power unit 200.

In the case of a composite cable of the related art for the same purpose, points in time when communication and power supply are performed through the communication unit 100 and the power unit 200 are different and thus it is expected shielding of the power unit 200 is not an issue, but shielding of the power unit 200 should be performed necessarily when a position of a pneumatic sensor, a motor of an electric vehicle, or the like are considered.

Accordingly, according to the present disclosure, the cable shielding layer 300 may be further provided to prevent the introduction or leakage of noise due to a nearby communication cable, control cable, or power cable.

The communication unit shielding layer 130 and the cable shielding layer 300 of the composite cable 1000 of the present disclosure may be metal shielding tapes, and preferably, the metal shielding tapes may be aluminum Mylar tapes.

The communication unit shielding layer 130 may be provided independently from the communication unit 100 to prevent or minimize either a malfunction of a sensor of the ABS due to an inrush current or the like that may be generated when the EPB is operated (when a vehicle is stopped or started) or a flickering error of a warning light related to the malfunction of the sensor.

In addition, the cable shielding layer 300 may be provided separately to alleviate mutual influence due to electromagnetic wave noise or interference between cables connecting a pneumatic sensor, a motor of an electric vehicle or the like, which may be arranged near the composite cable 1000 for a vehicle according to the present disclosure.

The cable jacket layer 400 may be provided outside the cable shielding layer 300. The cable shielding layer 300 may be formed of a polyurethane material resistant to impact or vibration.

The cable jacket layer 400 may cover the outside of the cable shielding layer 300 such that an entire cross-section of the composite cable 1000 has a round shape, and an outer diameter D of the composite cable 1000 may be in a range of 9.5 mm to 10.5 mm.

In the composite cable 1000 for a vehicle according to the present disclosure, the communication unit 100 may be configured as an independent cable, in which the pair of communication lines 110*a* and 110*b* each having a round shape are arranged to be circumscribed about each other and are covered together with the communication unit shielding layer 130 and the communication unit jacket layer 150.

Thus, as shown in FIG. 2, a cross section of the communication unit shielding layer 130 may have a track or long hole shape.

The communication unit jacket layer 150 covers the outside of the communication unit shielding layer 130 such that the communication unit 100 has a circular cross section.

Therefore, as shown in FIG. 2, the thickness t of the communication unit jacket layer 150 in the radial direction is not uniform.

The communication unit jacket layer 150 may be formed of polyurethane to protect the communication unit jacket layer 150 from impacts, and thus, when the communication unit jacket layer 150 does not have an appropriate thickness, the communication lines 110*a* and 110*b* of the communication unit 100 may be exposed due to external impact or vibration, during the driving of a vehicle, or when the composite cable 1000 is bent in a cable laying process. When the communication unit jacket layer 150 is extremely thin, processability and workability cannot be secured. Therefore, it was confirmed through various experiments that the thickness t of the communication unit jacket layer 150 in the radial direction is preferably 0.4 mm or more.

When the thickness t of the communication unit jacket layer 150 in the radial direction is not appropriate, an external impact may be directly delivered to the communication lines 110a and 110b, and the communication unit shielding layer 130 and the cable shielding layer 300 may come into close contact with each other, thereby reducing the shielding performance of the communication unit shielding layer 130.

That is, because the communication unit shielding layer 130 formed of an aluminum Mylar tape or the like includes metal foil, the communication unit jacket layer 150 may be broken due to an external impact or vibration or when bent, and thus, independent shielding states of the communication unit 100 and the power unit 200 may be canceled when the communication unit shielding layer 130 and the cable shielding layer 300 are in contact with each other.

Therefore, when the outer diameter D of the composite cable 1000 for a vehicle according to the present disclosure is in a range of 9.5 mm to 10.5 mm, the thickness t of the communication unit jacket layer 150 in the radial direction is preferably 0.4 mm or more when a material such as polyurethane of the composite cable jacket layer 150 is considered, and in this case, an outer diameter d100 of the communication unit 100 may be in a range of 4.1 mm to 4.5 mm.

The outer diameter d100 of the communication unit 100 configured as described above may be set to be greater than a diameter d200 of each of the power lines 210a and 210b of the power unit 200, so that the communication unit 100 and the power unit 200 may be arranged in an isosceles triangular shape while being circumscribed about each other.

Figure 3:
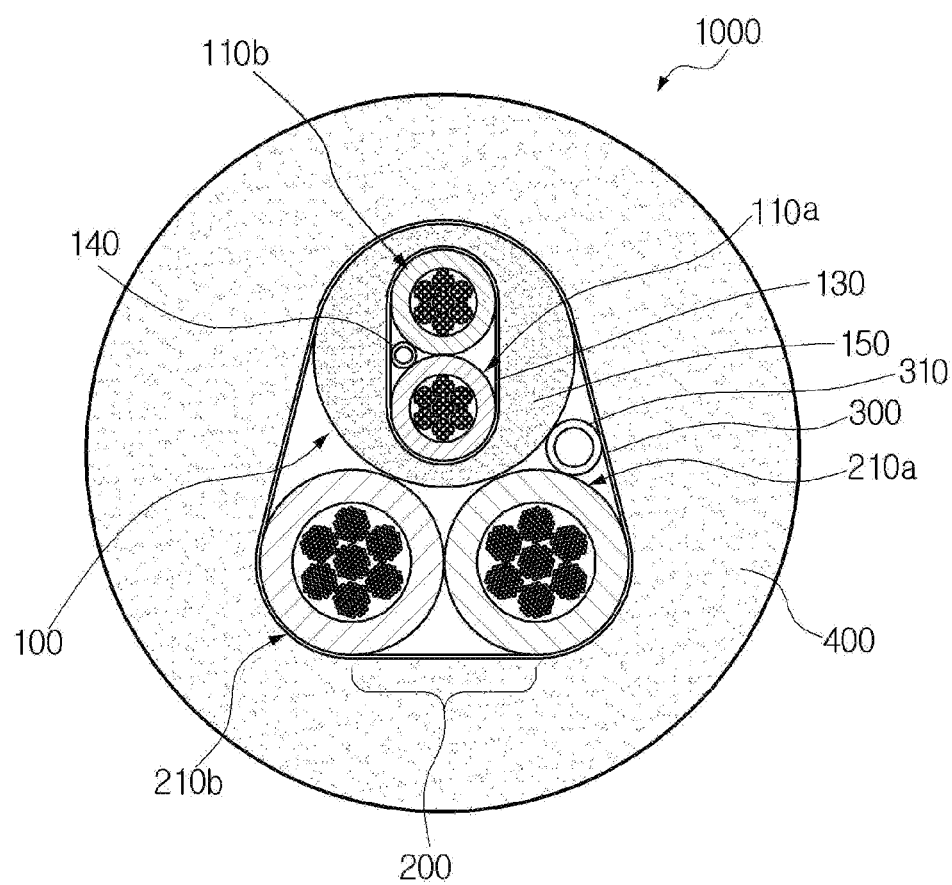
FIG. 3 is a cross-sectional view of a composite cable for a vehicle according to another embodiment of the present disclosure.

FIG. 3 is a cross-sectional view of a composite cable for a vehicle according to another embodiment of the present disclosure. A description of parts that are the same as those of FIG. 2 will be omitted here.

In the embodiment of FIG. 3, at least one communication unit ground wire 140 may be further included in a communication unit shielding layer 130 of a communication unit 100 or at least one cable ground wire 310 may be further included in a cable shielding layer 300, when compared to the above-described embodiment.

Each of the ground wires 140 and 310 is formed of a tinned copper material to shield the shielding layers 130 and 300, thereby greatly enhancing the shielding performance of the shielding layers 130 and 300.

The communication unit ground wire 140 of FIG. 3 is arranged in contact with outer circumferential surfaces of a pair of communication lines 110a and 110b and an inner side of the communication unit shielding layer 130 to use an empty space of the communication unit 100, and the communication unit shielding layer 130 may be directly grounded because the communication unit ground wire 140 is in contact with the communication unit shielding layer 130.

As shown in FIG. 3, a diameter of the communication unit ground wire 140 may be set to be less than those of the communication lines 110a and 110b.

Similarly, the cable ground wire 310 may be mounted in contact with an outer circumferential surface of the communication unit 100, an outer circumferential surface of a power line 210a or 210b, and an inner side of the cable shielding layer 300 to use an empty inner space of the cable shielding layer 300, and be arranged in contact with the cable shielding layer 300 to directly ground the cable shielding layer 300, thereby greatly reinforcing shielding performance.

In addition, the cable ground wire 310 may be also formed of a tinned copper material and a diameter thereof may be set to be less than that of the power line 210a or 210b.

Figure 4:
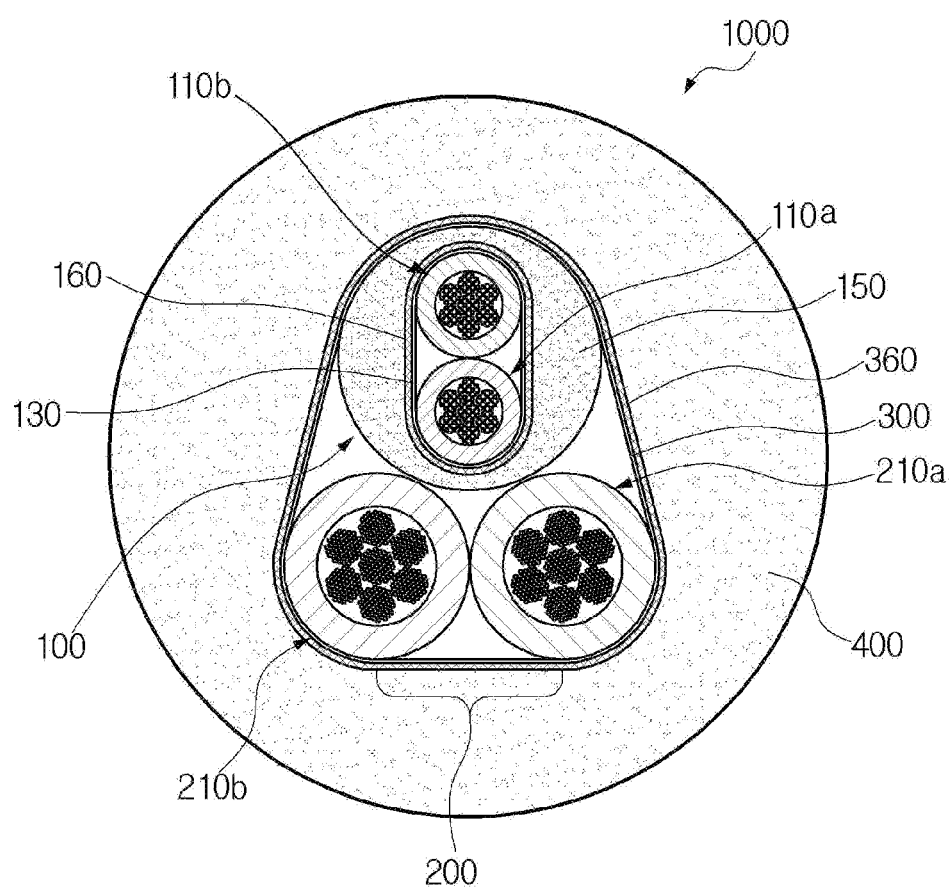
FIG. 4 is a cross-sectional view of a composite cable for a vehicle according to another embodiment of the present disclosure.

FIG. 4 is a cross-sectional view of a composite cable for a vehicle according to another embodiment of the present disclosure. A description of parts that are the same as those of FIGS. 2 and 3 will be omitted here.

In the embodiment of FIG. 3, a structure in which a ground wire is added to a position in contact with each shielding layer is employed, so that each shielding layer may be directly grounded to improve shielding performance.

In contrast, a structure in which a braid shielding layer 160 is provided outside a communication unit shielding layer 130 and a braid shielding layer 360 is provided outside a cable shielding layer 300 is applied to the embodiment of FIG. 4. By applying such a double-shielding structure, an effect of double-reinforcing the shielding layers 130 and 300 may be obtained.

In addition, because the communication unit shielding layer 130 and the cable shielding layer 300 are configured in the form of an aluminum Mylar tape and thus basically provide a shielding effect, and may maintain a twisted state of communication lines therein or the communication unit 100 and the power lines 210a and 210b and prevent distortion of the shapes thereof. Therefore, the workability of a cable manufacturing process may be more improved than when a braid shielding layer is provided while the communication unit shielding layer 130 and the cable shielding layer 300 are omitted.

The braid shielding layers 160 and 360 are each formed of a metal material and thus may provide a higher shielding effect than those of and the outside of the communication unit shielding layer 130 and the cable shielding layer 300, function as additional shielding layers, and may be configured to be grounded at an end of the composite cable 1000 through a connector, thereby achieving an effect of reinforcing the shielding layers and adding a ground wire.

The braid shielding layers 160 and 360 may also be formed of a tinned copper material.

Figure 5:
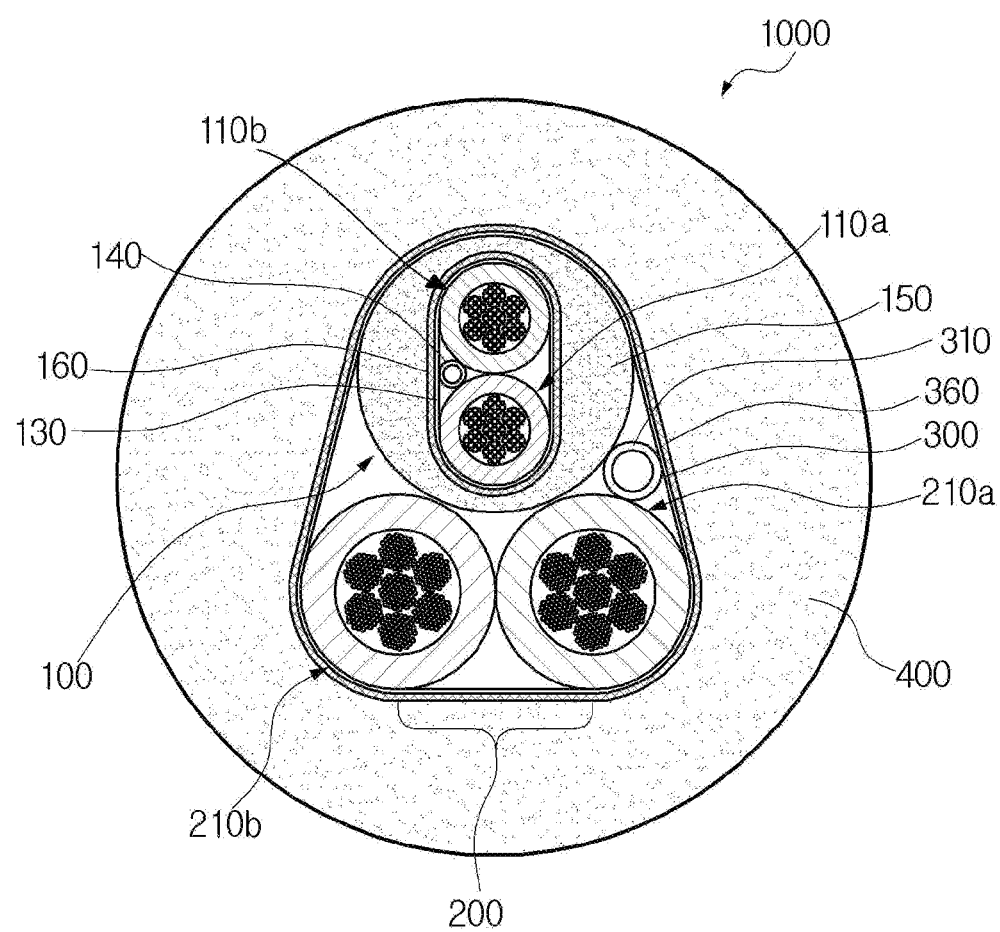
FIG. 5 is a cross-sectional view of a composite cable for a vehicle according to another embodiment of the present disclosure.

FIG. 5 is a cross-sectional view of a composite cable for a vehicle according to another embodiment of the present disclosure. A description of parts that are the same as those of FIGS. 3 and 4 will be omitted here.

In the embodiment of FIG. 5, at least one communication unit ground wire 140 may be included in a communication unit shielding layer 130 of a communication unit, at least one cable ground wire 310 may be included in a cable shielding layer 300, and braid shielding layers 160 and 360 are further respectively provided on outsides of the communication unit shielding layer 130 and the cable shielding layer 300.

Accordingly, the communication unit shielding layer 130 and the cable shielding layer 300, which are in the form of an aluminum Mylar tape, and the braid shielding layers 160 and 360 provide a double-shielding structure, and the ground wires 140 and 310 and the braid shielding layers 160 and 360 provide a double-grounding structure, thereby greatly improving electromagnetic wave shielding performance.

A communication unit 100 and a power unit 200 of a composite cable 1000 according to the present disclosure will be described in detail with reference to FIGS. 6 and 7 below.

Figure 6:
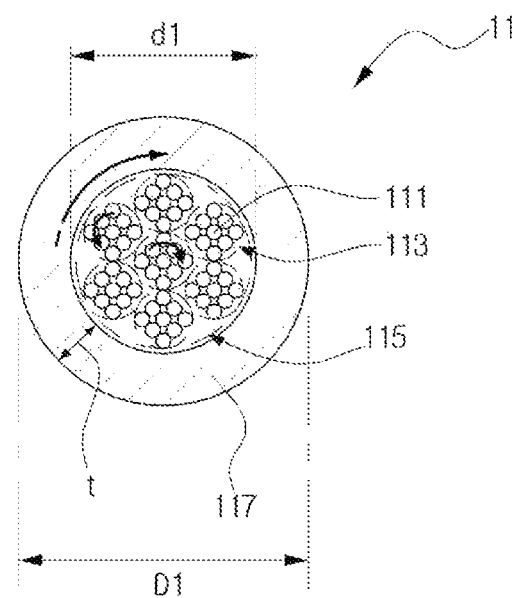
FIG. 6 is an enlarged cross-sectional view of a communication line of a communication unit to which a composite cable for a vehicle according to an embodiment of the present disclosure is applied.

FIG. 6 is an enlarged cross-sectional view of a power line 110 of the power unit 100 of the composite cable 1000 for a vehicle according to an embodiment of the present disclosure.

As shown in FIGS. 1 and 2, the communication unit 100 may be configured in the form of an independent cable including a pair of communication lines 110a and 110b each including a conductor 111 having an insulating layer 117, and a communication unit shielding layer 130 and a communication unit jacket layer 150 for sealing the pair of communication lines 110a and 110b.

The conductor 111 of each of the communication lines 110 of the communication unit 100 has a diameter less than that of a conductor 211 of a power line 210 of the power unit 200 and may thus be formed of a copper alloy material having excellent rigidity against bending forces, and the insulating layer 117 for insulating the conductor 111 may be formed of a crosslinked XLPE material having excellent heat resistance, flame retardancy and flexibility.

The insulating layer 117 of each of the communication lines 110 of the communication unit 100 may have a thickness of 0.4 mm to 0.5 mm, and the communication line 110 may have an insulating outer diameter D1 of 1.6 mm to 1.8 mm.

The conductor 111 of each of the communication lines 110 of the communication unit 100 may be a self-twist and helically wound conductor 115 manufactured by twisting multiple strands to form self-twisted strands with a twist pitch and helically winding the self-twisted strands 113 with a winding pitch.

As shown in FIG. 6, the self-twist and helically wound conductor 115 may include one center self-twisted strand 113, and six self-twisted strands 113 arranged around the center self-twisted strand 113 and twisted in a direction opposite to a direction in which the center self-twisted strand 113 is twisted, and a direction in which the self-twisted strands 113 are helically wound may be set to be the same as a direction in which the center self-twisted strand 113 is twisted, thereby minimizing an empty space of a cross section of the conductor 115.

That is, the direction of twisting the center self-twisted strand 113 may be set to be different from the direction of twisting an outer self-twisted strands 113, and the direction of helically winding the self-twisted strands 113 may be set to be different from the direction of twisting the outer self-twisted strands 113 (in order of S-twist-Z-twist-S-twist or Z-twist-S-twist-Z-twist), and when the twist pitch of each of the self-twisted strands 113 of the communication line 110 is set to be less than the winding pitch of the self-twist and helically wound conductor 115, the strands or the self-twisted strands 113 may be prevented from being loosen and flexibility of the self-twist and helically wound conductor 115 may be achieved.

Although in the embodiment of FIG. 6, an example in which the number of strands constituting the self-twisted strands 113 of the communication line 110 is nine, the number of strands constituting the self-twisted strands 113 may be determined to be in a range of five to ten and each of the strands may be determined such that an outer diameter d1 of each of the self-twisted strands 115 of the communication line 110 is in a range of 0.8 mm to 1.0 mm. For example, each of the strands may be set to have a diameter of 0.08 mm or less.

As shown in FIG. 6, the self-twist and helically wound conductor 115 may include the insulating layer 117, the insulating layer 117 may have a thickness of 0.4 mm to 0.5 mm, a total outer diameter D1 of the communication line 110 may be in a range of 1.65 mm to 1.70 mm, and as shown in FIG. 2, in order to prevent the pair of communication lines 110a and 110b from being twisted, the pair of communication lines 110a and 110b may be twisted together in a direction opposite to the direction in which the self-twist and helically wound conductor 115 is twisted (e.g., Z-twist or S-twist), covered with the communication unit shielding layer 130, and coated with the communication unit jacket layer 150. In this case, a binding pitch between the pair of communication lines 110a and 110b may be less than 40 mm to enhance mechanical properties.

The communication unit jacket layer 150 may be formed of a polyurethane material having impact resistance, oil resistance, and weather resistance, and a thickness thereof may be determined such that a total outer diameter d of the communication unit 100 is in a range of 4.1 mm to 4.5 mm.

As described above, the communication unit 100 is coated with a communication unit shielding layer 130 and the communication unit jacket layer 150 in a state in which the pair of communication lines 110a and 110b are arranged in parallel, and thus, the thickness of the communication unit jacket layer 150 may not be the same in whole regions thereof but is preferable that all cross sections of the communication unit 100 have a round shape.

Figure 7:
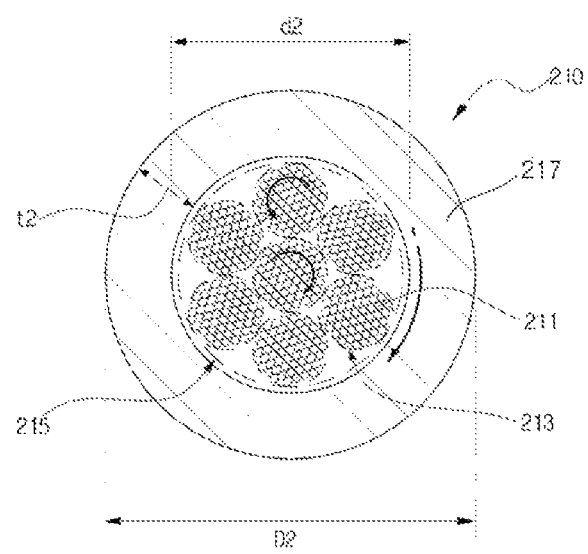
FIG. 7 is an enlarged cross-sectional view of a power line of a power unit to which a composite cable for a vehicle according to an embodiment of the present disclosure is applied.

FIG. 7 is an enlarged cross-sectional view of a power line 210 of a power unit 200 to which a composite cable 1000 for a vehicle according to an embodiment of the present disclosure is applied.

Each power line 210 of the power unit 200 may include a conductor 211 and an insulating layer 217 that insulates the conductor 211, and the insulating layer 217 may be formed of crosslinked XLPE having excellent heat resistance, flame retardancy, and flexibility.

The conductor 211 of the power line 210 may be formed of a tinned copper material in consideration of solderability and the like during bonding of a connector at an end thereof.

The insulating layer 217 of the power line 210 of the power unit 200 may have a thickness t2 of 0.4 mm to 0.5 mm, and the power line 210 may have an insulating outer diameter D2 of 2.8 mm to 3.2 mm.

Similar to the communication unit 100 described above, the conductor 211 of the power line 210 of the power unit 210 may be a self-twist and helically wound conductor 215 manufactured by twisting multiple strands to form self-twisted strands 213 with a twist pitch and helically winding the self-twisted strands 213 with a winding pitch. The self-twist and helically wound conductor 215 of the power unit 200 may include one center self-twisted strand 213 and six self-twisted strands 213 arranged around the center self-twisted strand 213 and twisted in a direction opposite to a direction in which the center self-twisted strand 213 is twisted. A direction in which the self-twisted strands 213 are helically wound with the winding pitch may be the same as a direction in which the center self-twisted strand 213 is twisted. The twist pitch of the self-twisted strands 213 of the power line 211 of the power unit 210 may be less than the winding pitch of the self-twist and helically wound conductor 215.

Therefore, the strands or the self-twisted strands 213 may be prevented from being loosen and flexibility of the self-twist and helically wound conductor 215 may be achieved.

The number of strands 211 constituting the self-twisted strands 213 of the power line 210 of the communication unit 200 may be fifty to sixty, and the self-twist and helically wound conductor 215 of the power unit 200 may have an outer diameter d2 of 1.8 mm to 2.2 mm.

The insulating layer 217 of the power line 210 may be also formed of an XLPE material and have a thickness of 0.4 mm to 0.5 mm, and the power line 210 may have an insulating outer diameter D2 of 2.7 mm to 3.1 mm.

The communication unit 100 including the communication line 110 and the power line 200 including the power line 210 described above with reference to FIGS. 6 and 7 may be coated with the cable shielding layer 300 and the cable jacket layer 400 as shown in FIG. 2, and may be twisted with a binding pitch of 120 mm or less in a direction opposite to a direction in which the communication lines 110 of the communication unit 100 are twisted (e.g., S-twist or Z-twist), covered with the cable shielding layer 300, and coated with the cable jacket layer 400, thereby completing the composite cable 1000. As described above, excellent flexibility and bending resistance may be secured by twisting the power unit 200 and the communication unit 100 together with a binding pitch of 120 mm or less.

There is a thickness variation in the regions of the cable jacket layer 400 but all cross sections of the composite cable 1000 may have a round shape having an outer diameter D of 9.5 mm to 10.5 mm.

Figure 8:
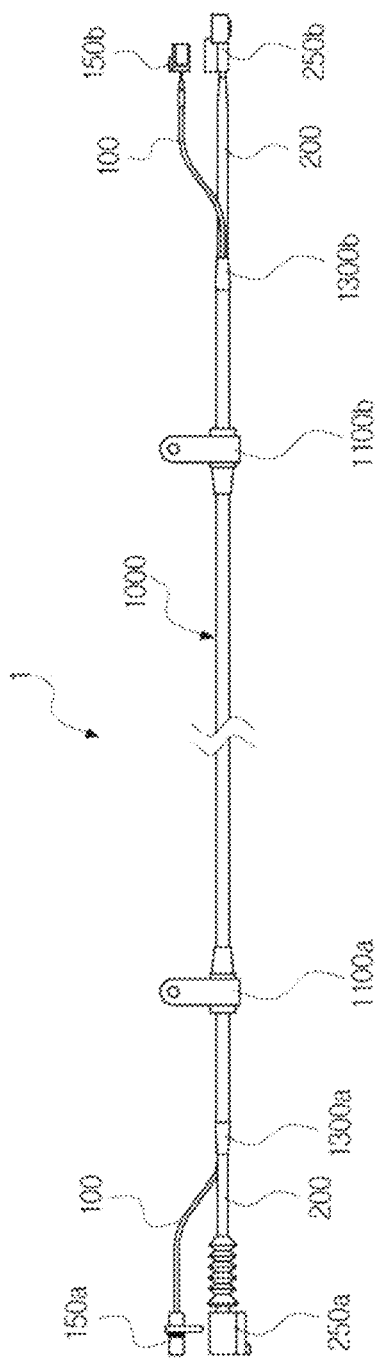
FIG. 8 shows an example of a composite cable assembly, for a vehicle, to which a composite cable for a vehicle according to an embodiment of the present disclosure is applied.

FIG. 8 shows an example of a composite cable assembly 1, for a vehicle, to which a composite cable 1000 for a vehicle according to an embodiment of the present disclosure is applied.

The composite cable assembly for a vehicle may include the composite cable 1000, a pair of communication connectors for a brake device of the ABS, which are connected to communication units 100 located at both ends of the composite cable 1000, and a pair of power connectors 250a and 250b for the EPB, which are connected to power units 200 located at both ends of the composite cable 1000.

As shown in FIGS. 1 and 8, in predetermined sections of both ends of the composite cable 1000, the cable shielding layer 300 and the cable jacket layer 400 may be stripped and the communication unit 100 and the power unit 200 may be split, and the communication unit 100 and the power unit 200 may be split through terminal units 1300a and 1300b or split regions may be taped.

The composite cable assembly 1 of the present disclosure may include at least one fastening unit 1100 to be fixed in an installation path even when vibration and impact are applied to the inside of a vehicle. The fastening unit 1100 may be configured in various forms to support an outer circumferential surface of the composite cable 1000.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A composite cable for a vehicle, comprising:
   a communication unit including: a pair of communication lines to transmit a sensor sensing signal, and a communication unit jacket layer covering an outside of the pair of communication lines;
   a power unit including a pair of power lines to supply power; and,
   a cable jacket layer covering an outside of the communication unit and the power unit,
   wherein the communication unit jacket layer covers the pair of communication lines such that the communication unit has a round cross section, and the thickness of the communication unit jacket layer in a radial direction is 0.4 mm or more, and the communication unit has an outer diameter of 4.1 mm to 4.5 mm, and,
   wherein the conductor of each of the communication lines of the communication unit comprises a self-twist and helically wound conductor, and wherein the self-twist and helically wound conductor comprises one center self-twisted strand and six self-twisted strands arranged around the center self-twisted strand and twisted in a direction opposite to a direction in which the center self-twisted strand is twisted, wherein a direction in which the self-twisted strands are helically wound is the same as a direction in which the center self-twisted strand is twisted.

2. The composite cable of claim 1, wherein the communication unit is provided to transmit a sensor sensing signal of an anti-lock brake system (ABS), and the power unit is provided to supply power to an electronic parking brake (EPB).

3. The composite cable of claim 1, wherein an outer diameter of the communication unit is greater than an outer diameter of each of the pair of power lines of the power unit.

4. The composite cable of claim 1, wherein the pair of communication lines of the communication unit each comprise a conductor formed of a copper alloy material and an insulating layer configured to insulate the conductor and formed of an XLPE material, and each have a round cross section.

5. The composite cable of claim 1, wherein the self-twist and helically wound conductor is manufactured by twisting multiple strands to form self-twisted strands with a twist pitch and helically winding the self-twisted strands with a winding pitch.

6. The composite cable of claim 5, wherein the twist pitch of the self-twisted strands of the communication lines of the communication unit is less than the winding pitch of the self-twisted and helically wound conductor.

7. The composite cable of claim 1, wherein the number of strands constituting the self-twisted strands of each of the communication lines of the communication unit is five to ten.

8. The composite cable of claim 1, wherein the twist pitch of the self-twisted strands of each of the power lines of the power unit is less than the winding pitch of the self-twist and helically wound conductor.

9. The composite cable of claim 1, wherein the power lines of the power unit each comprise a conductor and an insulating layer configured to insulate the conductor and formed of an XLPE material, wherein the conductor is formed of a tinned copper material and wherein the insulating layer of each of the power lines of the power unit has a thickness of 0.4 mm to 0.5 mm, and the power lines have an insulating outer diameter of 2.8 mm to 3.2 mm.

10. The composite cable of claim 1, wherein the number of strands constituting the self-twisted strand of each of the power lines of the communication unit is fifty to sixty, and the self-twist and helically wound conductor of the power unit has an outer diameter of 1.8 mm to 2.2 mm.

11. The composite cable of claim 1, wherein the pair of communication lines of the communication unit are twisted with a binding pitch of 40 mm or less.

* * * * *